US012112643B2

(12) United States Patent
Waaler

(10) Patent No.: US 12,112,643 B2
(45) Date of Patent: Oct. 8, 2024

(54) SYSTEM AND METHOD TO IMPROVE NOTICE TO AIRMEN (NOTAM) READABILITY

(71) Applicant: ARINC Incorporated, Annapolis, MD (US)

(72) Inventor: Luke Waaler, Fort Mill, SC (US)

(73) Assignee: ARINC Incorporated, Annapolis, MD (US)

( * ) Notice: Subject to any disclaimer, the term of this patent is extended or adjusted under 35 U.S.C. 154(b) by 19 days.

(21) Appl. No.: 17/976,285

(22) Filed: Oct. 28, 2022

(65) Prior Publication Data

US 2024/0144832 A1 May 2, 2024

(51) Int. Cl.
*G08G 5/00* (2006.01)

(52) U.S. Cl.
CPC ......... *G08G 5/0021* (2013.01); *G08G 5/0013* (2013.01); *G08G 5/003* (2013.01)

(58) Field of Classification Search
CPC ..... G08G 5/0021; G08G 5/0013; G08G 5/003
See application file for complete search history.

(56) References Cited

U.S. PATENT DOCUMENTS 7,848,918 B2 12/2010 Li et al.
8,204,874 B2 6/2012 Wei et al.
8,340,839 B2 * 12/2012 Yogesha .............. G08G 5/0021 701/3
8,751,242 B2 6/2014 Arasada
8,970,399 B1 3/2015 Zimmer et al.
9,031,832 B2 5/2015 Boguraev et al.
9,355,084 B2 5/2016 Doornenbal
9,704,407 B2 * 7/2017 Passinger ............. G08G 5/0047
10,109,203 B2 * 10/2018 Chmelarova .......... G08G 5/025
10,482,774 B2 11/2019 Bonnet et al.
10,529,240 B2 1/2020 Whitlow et al.
10,839,285 B2 11/2020 Guo
11,068,653 B2 7/2021 Gahlot et al.
11,152,084 B2 10/2021 Kondadadi et al.
2015/0170492 A1 6/2015 Zimmer et al.
2016/0209234 A1 7/2016 Passinger et al.
2017/0310749 A1 10/2017 Vasek et al.
(Continued)

FOREIGN PATENT DOCUMENTS

EP 3051520 A1 8/2016

OTHER PUBLICATIONS

European Search Report No. 23205736.4 (Year: 2024).*
(Continued)

*Primary Examiner* — John A Tweel, Jr.
(74) *Attorney, Agent, or Firm* — Suiter Swantz IP

(57) ABSTRACT

A system and method for generating an enhanced set of NOTAMs. The system and method include converting one or more abbreviated terms of a NOTAM text of the NOTAM into one or more respective expanded terms. The system and method include applying a set of capitalization rules to the NOTAM text. The system and method include emphasizing a portion of each word of the NOTAM text based on one or more emphasizing rules, where words are terms with only letters. The system and method include directing at least a portion of the enhanced set of NOTAMs to be at least one of displayed via a display or physically printed by a printer.

12 Claims, 7 Drawing Sheets

(56) References Cited

U.S. PATENT DOCUMENTS

| | | | | |
|---|---|---|---|---|
| 2018/0196921 | A1 | 7/2018 | Devarakonda et al. | |
| 2018/0300077 | A1 | 10/2018 | Srinivasan et al. | |
| 2021/0303786 | A1 | 9/2021 | Veyseh et al. | |
| 2022/0067294 | A1 | 3/2022 | Chikoti et al. | |
| 2023/0237916 | A1* | 7/2023 | Artic | G08G 5/025 340/971 |
| 2023/0334241 | A1* | 10/2023 | Daly | G06F 40/232 |
| 2023/0392954 | A1* | 12/2023 | Rao | G08G 5/0039 |

OTHER PUBLICATIONS

Gaynor, Will this "bionic" font help you read faster, Literary Hub (May 31, 2022) (Accessed Sep. 19, 2022), https://lithub.com/will-this-bionic-font-help-you-read-faster/.

Maynard, et al., (2021). Natural language processing (NLP) techniques for Air Traffic Management Planning. AIAA Aviation 2021 Forum. https://doi.org/10.2514/6.2021-2322.

* cited by examiner

Unfiltered NOTAMs

406

Filtered NOTAMs based on relevance to flight plan

SYSTEM AND METHOD TO IMPROVE NOTICE TO AIRMEN (NOTAM) READABILITY

TECHNICAL FIELD

The present disclosure relates generally to Notice to Airmen (NOTAM), and, more particularly, to enhancing NOTAM.

BACKGROUND

In aviation, a NOTAM is a notice containing information that is essential to personnel concerned with flight operations. NOTAMs concern the establishment, condition, or change of an entity or action (e.g., vehicle, facility, service, procedure, or hazard) in the airspace or concerned with airspace operations.

NOTAMs consist almost entirely of abbreviations which make them difficult for humans to read and understand quickly. An example of a NOTAM is "SVC TWR CLSD MON-SUN 0100-1100, CLASS D SVC NOT AVBL CTC JACKSONVILLE APP AT 121.725." As a result, sometimes a reader of a NOTAM may miss important information, which can occasionally create a safety hazard for flights.

Other challenges include that the number of NOTAMS typically received may be numerous, further increasing the chance of missing important information. For example, there may be hundreds of NOTAMs a pilot may need to scan through of which, for instance, maybe 5% pertain to their planned route. Further, such an operation may require a large portion of the pilot's attention, reducing the amount of attention a pilot may spend on other important tasks. As pilot operations move towards single pilot operations over dual-pilot operations, the attention demands of the pilot may increase.

Therefore, it would be advantageous to provide a system or method that cures the issues described above.

SUMMARY

A system and method for generating an enhanced set of NOTAMs. The system and method include converting one or more abbreviated terms of a NOTAM text of the NOTAM into one or more respective expanded terms. The system and method include applying a set of capitalization rules to the NOTAM text. The system and method include emphasizing a portion of each word of the NOTAM text based on one or more emphasizing rules, where words are terms with only letters. The system and method include directing at least a portion of the enhanced set of NOTAMs to be at least one of displayed via a display or physically printed by a printer.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1A:
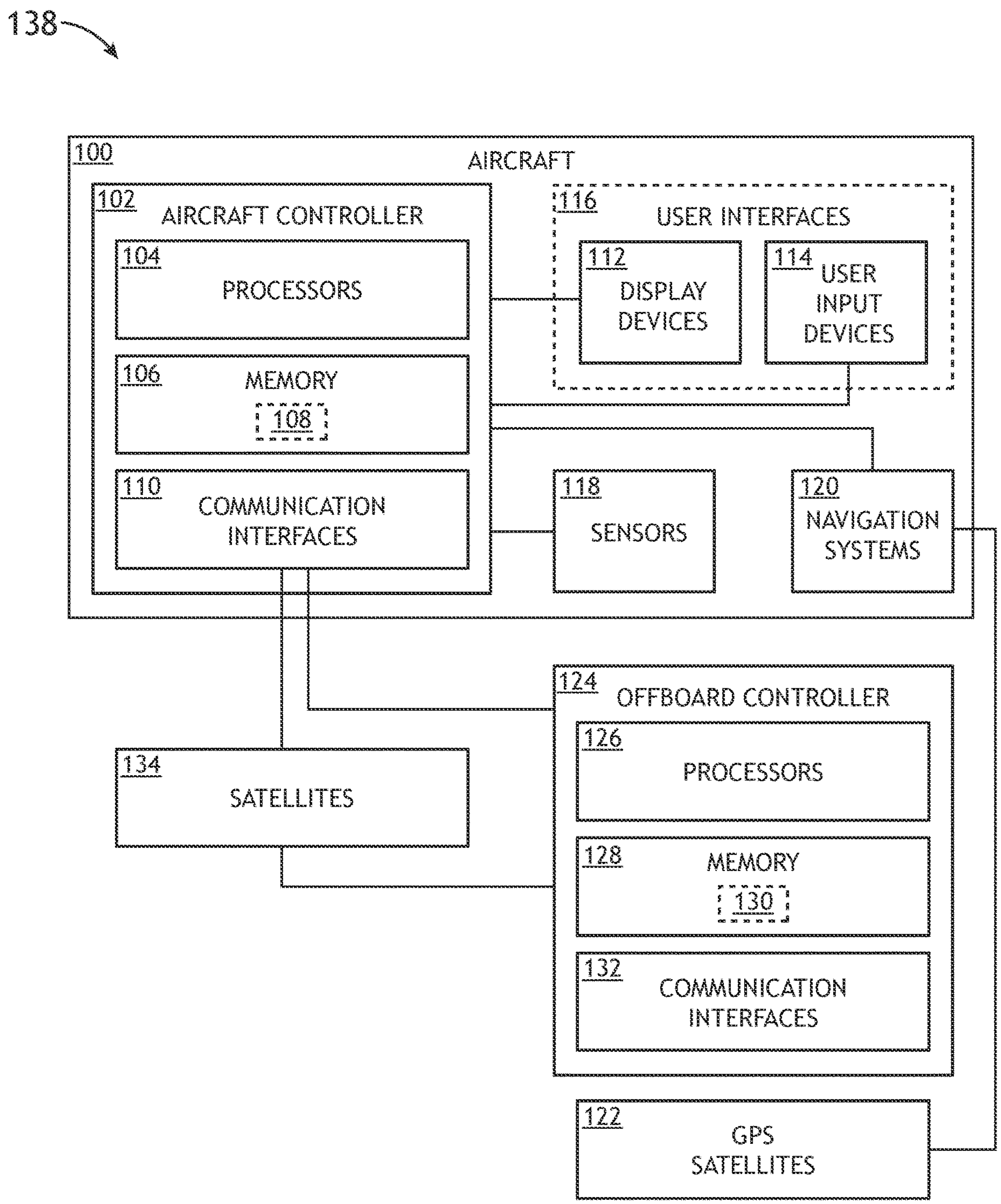
FIG. 1A illustrates a simplified block diagram of an aircraft including the electronic checklist system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "embodiments", "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1A-4B generally illustrate a system and method for use with NOTAMs.

Broadly speaking, at least some embodiments of the inventive concepts disclosed herein are directed to displaying an enhanced set of NOTAMs for increased readability, including filtering out irrelevant NOTAMs, and thereby decreasing the amount of time a user may need to spend reading NOTAMs. In embodiments, understandability and speed of reading NOTAMs may be improved, thereby increasing safety, efficiency, and attention bandwidth of users. This may free up valuable attention, but in a manner that still allows for user-monitoring of NOTAMs at a high level of understanding of important information.

In some situations, there may be hundreds of NOTAMs a pilot may need to scan through of which, for instance, maybe 5% pertain to their planned route. As a result, sometimes a reader of a NOTAM may miss important information, which can occasionally create a safety hazard for flights.

It is contemplated herein that it may be desirous to filter out irrelevant NOTAMs and to increase readability of NOTAMs using one or more of a variety of enhancements.

Figure 1B:
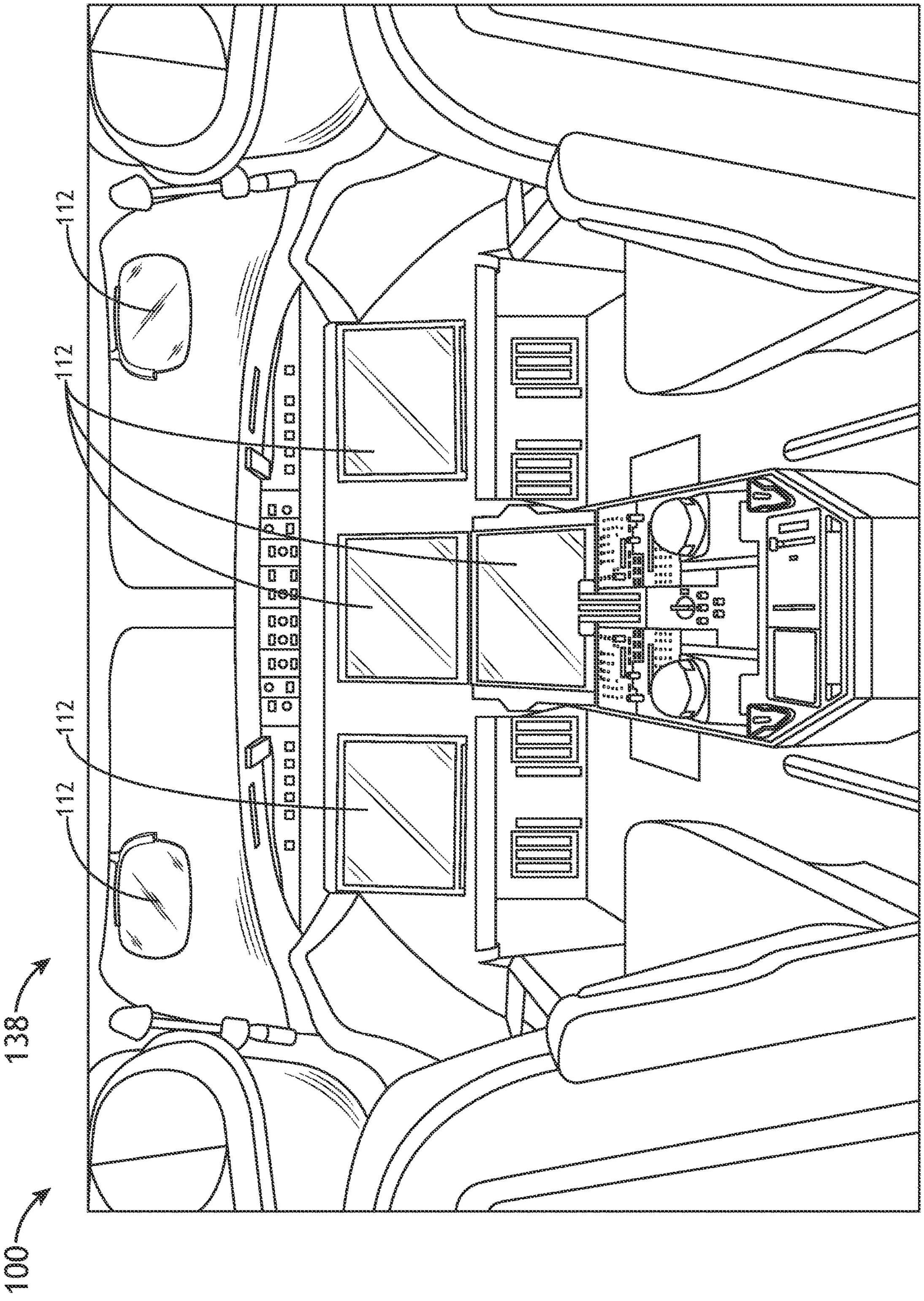
FIG. 1B illustrates an aircraft including the electronic checklist system, in accordance with one or more embodiments of the present disclosure.

FIGS. 1A-1B illustrate an aircraft including a system 138 for use with NOTAMs, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., chart data) and/or flight queue data to a pilot or other crew member. For example, the situational awareness data (e.g., chart data) may be based on, but is not limited to, aircraft performance parameters, aircraft performance parameter predictions, sensor readings, alerts, NOTAMS, enhanced NOTAMs, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component t analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 132 may be operatively configured to communicate with one or more components of the aircraft controller 102 and/or the one or more offboard controllers 124. For example, the one or more communication interfaces 110, 132 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 132 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

In embodiments, NOTAMs (e.g., any NOTAM such as an enhanced NOTAM) may be displayed via a GUI. For example, the GUI may be displayed on any computing device including a display and/or a touchscreen (i.e., a touch-sensitive display surface capable of accepting directed control input provided by a user by making contact with a particular location relative to the display surface, e.g., by tapping, pressing for an extended length of time, or directing a finger or stylus along the surface of the screen in a predetermined path) and in communication with networks or controller devices/systems aboard the aircraft. For example, the GUI may be displayed on an interactive panel display 112 within an airplane cockpit.

In embodiments, NOTAMs are printed. For example, enhanced NOTAMs may be printed using any method known in the art. For instance, printed may mean physically printed using a laser jet printer (not shown), or any other printer known in the art. For example, the controller may be configured to direct a printing of NOTAMs continuously, on a long continuous paper roll (not shown), as NOTAMs are received and enhanced to provide a continuous printout readable by a user.

Figure 2:
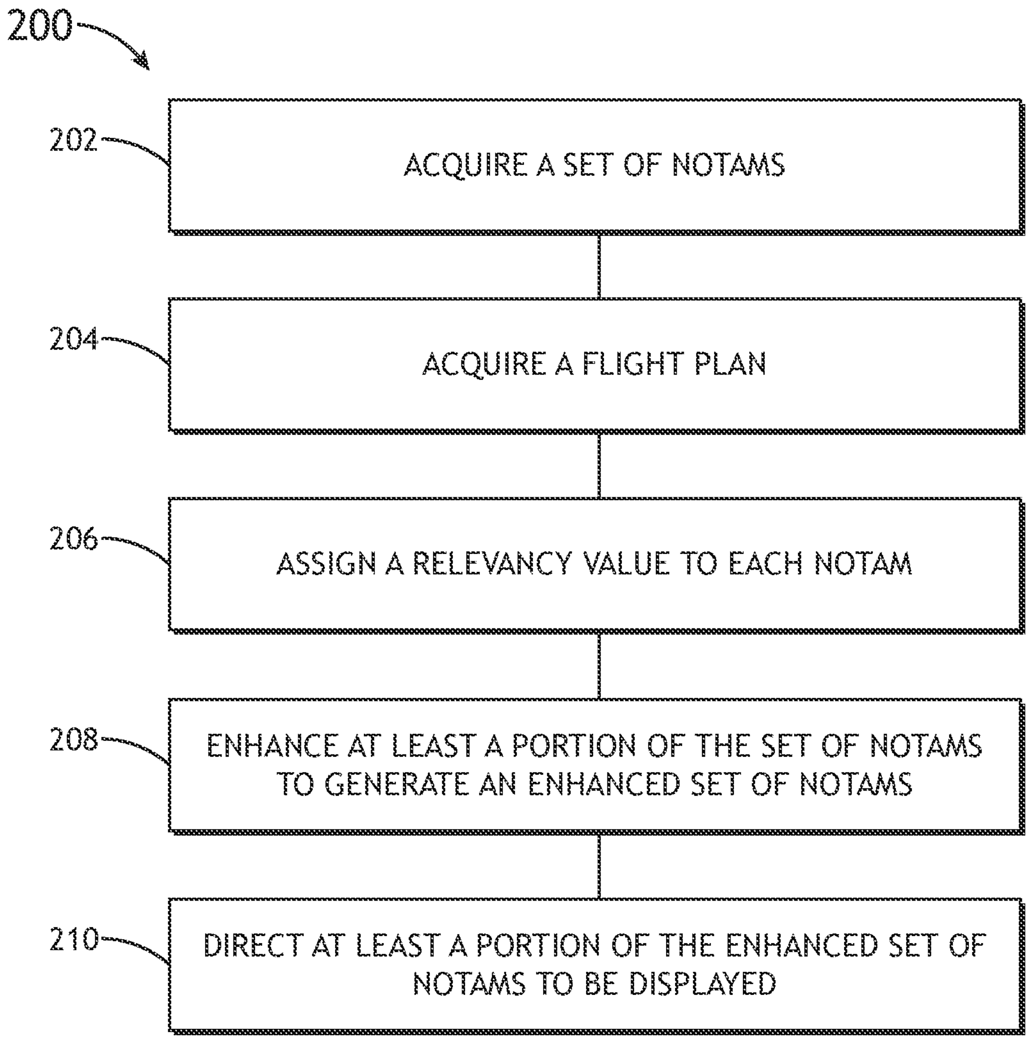
FIG. 2 illustrates a flow diagram depicting a method or process for use with NOTAMs, in accordance with one or more embodiments of the present disclosure.

Referring now to FIG. 2, a flow diagram depicting a method 200 for use with NOTAMs is disclosed, in accordance with one or more embodiments of the present disclosure. The present method may be a method of using elements or combinations of elements of FIGS. 1A-1B (e.g., system 138).

At step 202, a set of NOTAMs are acquired. In embodiments, each NOTAM may be received via a signal. For example, via an RF signal from an external source. For instance, via radio transmission such as from a satellite, another vehicle, a ground station, or the like.

In embodiments, each NOTAM may include NOTAM text and a geographic location. For example, a geographical location may be separate coordinate data, such as, but not limited to GPS coordinates or the NOTAM text itself may inherently include the geographic location. For example, a NOTAM may include NOTAM text that states, "SVC TWR CLSD MON-SUN 0100-1100, CLASS D SVC NOT AVBL CTC JACKSONVILLE APP AT 121.725". For instance, the term "JACKSONVILLE" may be associated with a GPS geographic location via a location database of GPS locations stored on memory 106 and associated with corresponding NOTAM terms. The controller 102 may be configured to look up the geographic location from such a location database that associates NOTAM terms with coordinate data. In another instance, the geographic location is determined via separate data included in the NOTAM and received along with the NOTAM text. For example, the RF signal may include the NOTAM text and also GPS coordinates. In an additional instance, the geographic location is determined based on the source of the NOTAM. For example, the NOTAM may be determined to originate from a particular ground station. In such an example, a coordinate stored in a database and associated with such a particular ground station may be used to determine the geographic coordinate of such a NOTAM. In one or more of these instances (or the like), the geographic location may be acquired (e.g., received, determined via a lookup table).

Figure 4A:
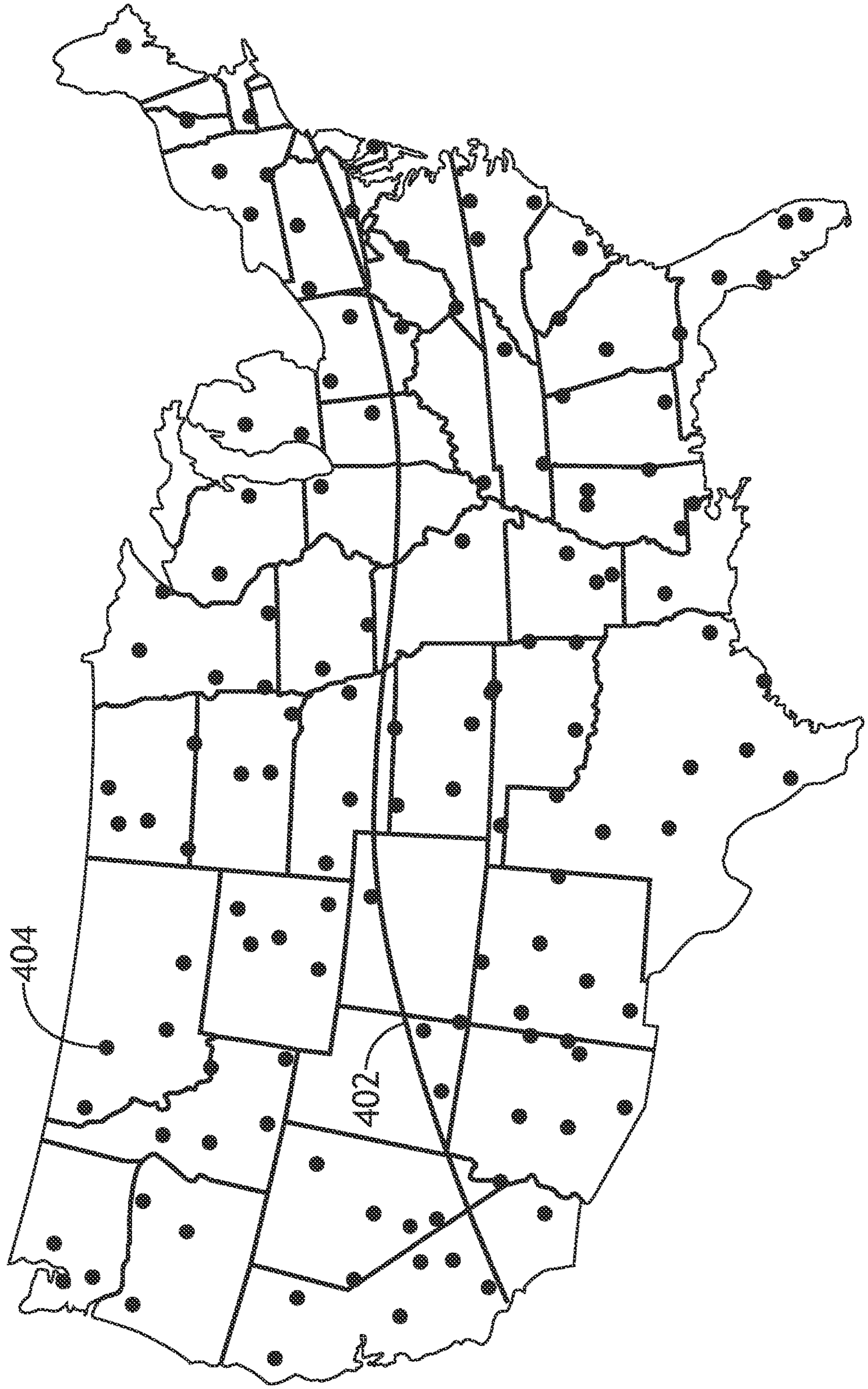
FIG. 4A illustrates a conceptual map of unfiltered NOTAMs and geographic flight data of a flight plan, in accordance with one or more embodiments of the present disclosure.
Figure 4B:
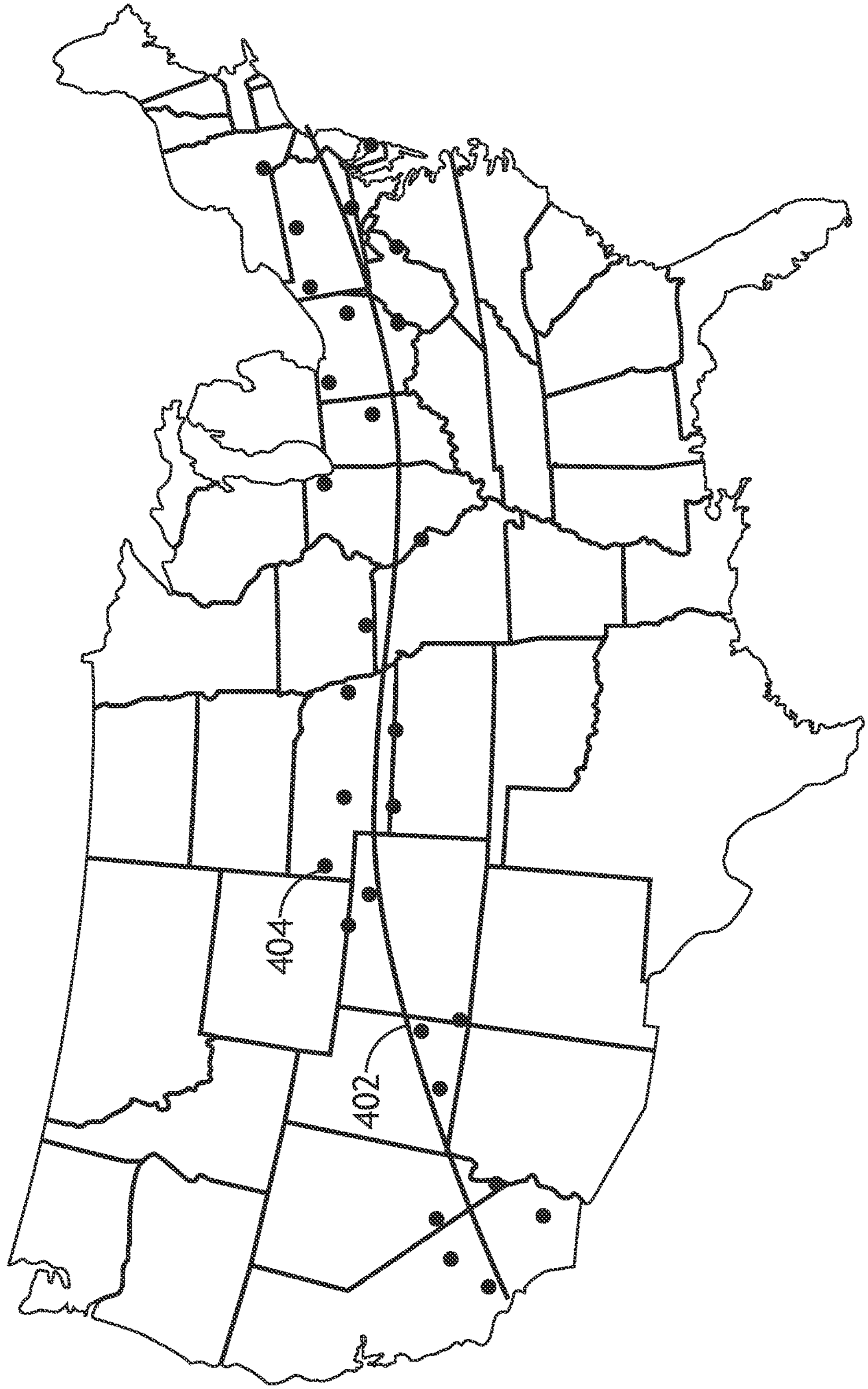
FIG. 4B illustrates a conceptual map of filtered NOTAMs and geographic flight data of a flight plan, in accordance with one or more embodiments of the present disclosure.

Examples of geographic locations 404 of NOTAMs are conceptually illustrated in FIGS. 4A and 4B.

At step 204, a flight plan is acquired. In embodiments, the flight plan may be received via a signal. For example, via an RF signal from an external source. For instance, via radio transmission such as from a satellite, another vehicle, a ground station, or the like.

In embodiments, the flight plan may include geographic flight data. For example, the geographic flight data may include a route, such as, but not limited to, waypoints. In the same or different example, the geographic flight data may include any other information such as, but not limited to, planned elevation data, planned speed, time of arrival, and the like.

An example of geographic flight data 402 of a flight plan is conceptually illustrated in simplified form in FIGS. 4A and 4B. Geographic flight data may be the planned route of the aircraft 100.

At step 206, a relevancy value is assigned to each NOTAM. In embodiments, the relevancy value is based on (at least) a distance (e.g., minimum distance) between the geographic location 404 of the NOTAM with at least a portion (e.g., any portion) of the geographic flight data 402. For example, the distance may be a threshold. For instance, if the geographic location 404 is within such a distance of the geographic flight data 402, then such a NOTAM may be determined to be relevant. For example, a high or positive relevancy value may be assigned. For example, a relevancy value may be a binary value (e.g., 0 or 1 for relevant or not relevant) and/or the relevancy value may be possibly a range of values (e.g., between 0.0 to 1.0). For example, if the geographic location 404 falls within the distance threshold, such a NOTAM may be assigned a relevancy value of 1.

Alternatively, the distance may not necessarily be a threshold, and could be a value. For example, the distance could be the minimum distance between the geographic location 404 and the route (i.e., geographic flight data 402). Such a distance could be used to assign a non-binary relevancy value to the NOTAM. For example, any equation such as: relevancy value=100,000(km)/distance may be used. In embodiments, during a display step (e.g., step 210), the relevancy value may be used to rank the NOTAMs from highest relevancy to lowest. For example, the NOTAMs may be ranked and then only a select portion (e.g., top 5, 10, 20, or the like most relevant) of the NOTAMS may be displayed.

At step 208, at least a portion of the set of NOTAMs are enhanced to generate an enhanced set of NOTAMs 312. For example, the portion of NOTAMs enhanced may be the portion that fall within the threshold distance, are the most relevant, or some other relevant-based metric. In this regard, the most relevant NOTAMs are enhanced and displayed, reducing the number of irrelevant NOTAMs shown to a user.

At step 210, at least a portion of the enhanced set of NOTAMs 312 are directed to be displayed via a display (e.g., display 112). For example, if only a limited number of NOTAMs fit on a GUI at a time, then the number of NOTAMs displayed may be limited to such a number. For example, the NOTAMs with the highest relevancy values may be ranked and prioritized for display based on such a ranking.

Figure 3:
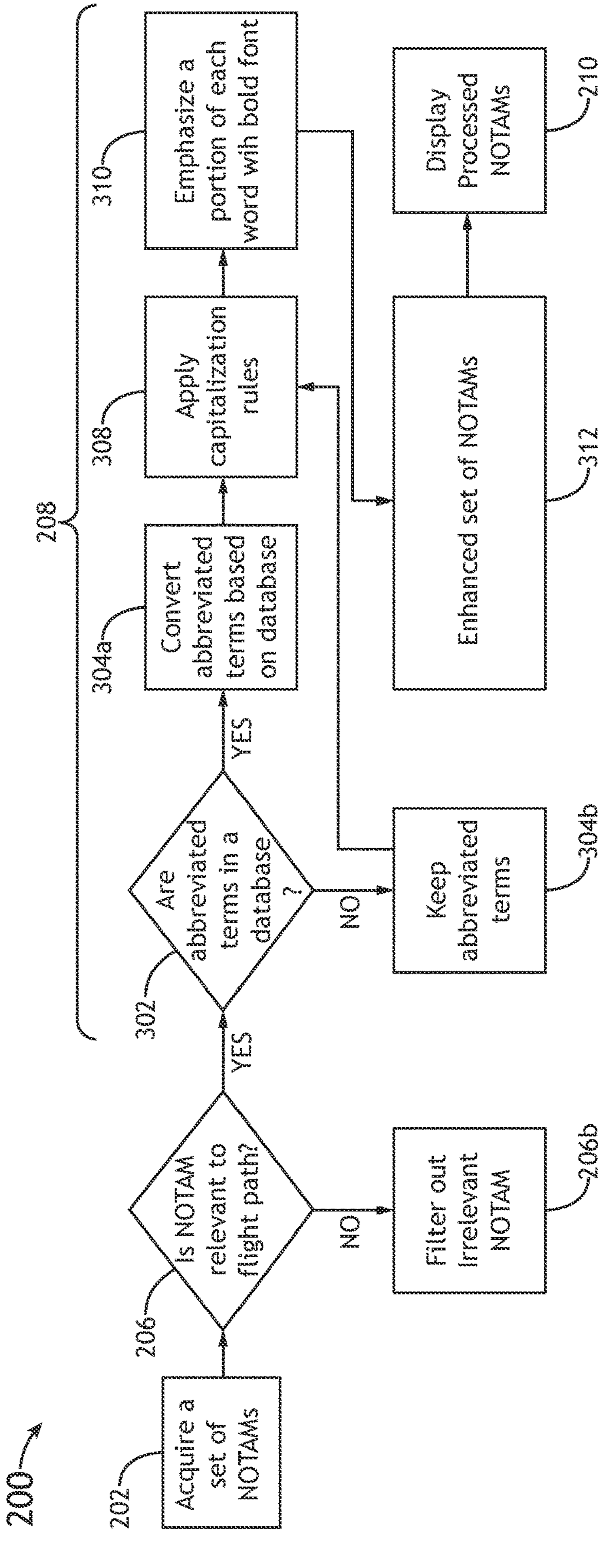
FIG. 3 illustrates a flow diagram depicting a method or process for use with NOTAMs, in accordance with one or more embodiments of the present disclosure.

Support is found at least in FIGS. 2 and 3. For example, the "enhanced set of NOTAMs" are labeled 312 in FIG. 3, and step 208 is also shown in FIG. 3 as including these enhanced set of NOTAMs.

Referring now to FIG. 3, a flow diagram depicting a method 300 for use with NOTAMs is disclosed, in accordance with one or more embodiments of the present disclosure. The present method may be a method of using elements or combinations of elements of FIGS. 1A-1B (e.g., system 138).

As shown in an optional step 206*b*, NOTAMs deemed irrelevant may be filtered out (e.g., labeled as irrelevant, ignored, removed from a list, not enhanced, not displayed, and the like).

Referring back to FIG. 2, step 208 may include one or more optional steps. For example, enhancing NOTAMs in step 208 may include, for at least a portion of the NOTAMs, converting abbreviated terms, applying capitalization rules, and/or emphasizing portions of words.

At optional steps 302, 304*a*, and 304*b*, terms of NOTAM text may be converted from an abbreviated form to an expanded (non-abbreviated) form. For example, "TWR" may be converted to "tower." At step 302, each term may be used to search a database stored on memory 128 for such a term. If such a term is indeed in the database, then at step 304*a*, such a term may be converted/replaced with an expanded form of the abbreviated form stored in the database. For example, the database may include abbreviated (NOTAM) terms paired with expanded (non-abbreviated natural language) terms. Note that a term may be expanded from one word to another word or one word to multiple words. If such an abbreviated term is not in the database, then at step 304*b* the abbreviated term may remain, at least temporarily, unchanged. For example, the term may not necessarily be expanded, but may still be replaced with a lower-case non-capitalized version of the abbreviated term and/or a form with emphasized (e.g., bolded) letters in a later step.

At optional step 308, a set of capitalization rules are applied to the NOTAM text. For example, common sentence capitalization rules used in common English grammar may be applied. For instance, the capitalization rules may include a rule for capitalizing a first letter of a sentence of the NOTAM text. In another instance, the capitalization rules may include a rule for converting at least some capitalized letters of entirely capitalized terms of the NOTAM text to lower case letters. For example, entirely capitalized words are defined as terms where each letter is capitalized. For example, words not stored in the database of abbreviated terms may have remained unchanged and may still be entirely capitalized. For example, if a word such as "TOWER" was not stored in an abbreviation database, using such a capitalization rule, "TOWER" may be converted to "tower". Such a converted, lower-case word may be generally relatively easier/quicker to read for an average user.

Nonlimiting, illustrative example outputs of applying example expanding and capitalization rules (of steps 302 through 308) for two NOTAMs are shown below. NOTAM example 1

OBST TOWER LGT (ASR 1050171) 383430.80N0844921.70 W (18.9NM ESE 811) 1229 FT (289 FT AGL) U/S . . .

becomes:

An obstruction tower 18.9 nautical miles east/southeast of 8I1 airport is not lighted in accordance with current regulations.

NOTAM example 2:

AIRSPACE AEROBATIC ACFT WI AN AREA DEFINED AS 1NM RADIUS OF FSO SFC-3500 FT DLY 1600-1700 . . .

becomes:

Aerobatic activity is taking place within a 1-mile radius of Franklin County State Airport (Highgate, VT).

Note that enhancing may include adding punctuation such as a period at the end of sentences and/or at the end of each NOTAM if not already present.

At optional step 310, a portion of each word of the NOTAM text may be emphasized based on one or more emphasizing rules. For example, emphasizing may include changing a graphical quality of one or more characters (e.g., letters, numbers) of the NOTAM text such as, but not limited to, a text line thickness (e.g., being bolded), a text color, a highlighting (e.g., changing text background), or the like.

In embodiments, the one or more emphasizing rules includes bolding a portion of each word of the NOTAM text. For example, the bolding may be determined by a set of bolding rules. For instance, bolding the words may include bolding a first letter of each word. For purposes of the present disclosure, "words" are generally terms (e.g., sets of characters separated by spaces, commas, and the like) that include only letters (rather than numbers). For example, for purposes of the present disclosure, "defined" is a word, but "1100UTC", and "500" are not words. In another instance, bolding the words may include bolding the first two letters of words having at least two letters. For example, if both rules above were used, then “a” would be completed bolded, and the letters “de” of “defined” would be bolded.

Figure 5:
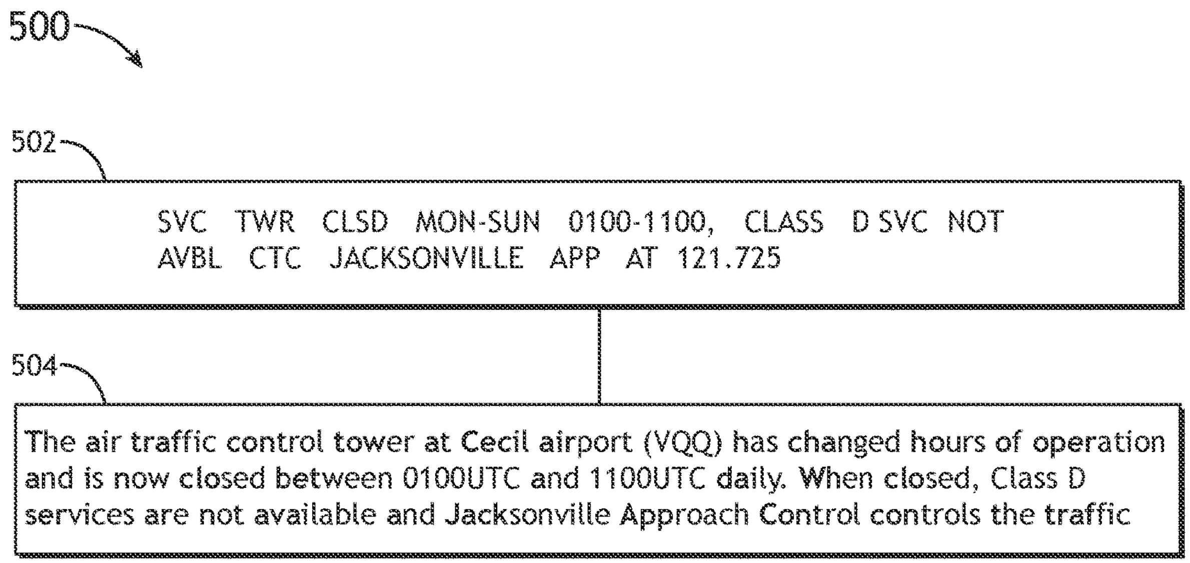
FIG. 5 illustrates a NOTAM before being enhanced and an enhanced NOTAM, in accordance with one or more embodiments of the present disclosure.

FIG. 5 illustrates a NOTAM before being enhanced 502 and an enhanced NOTAM 504, in accordance with one or more embodiments of the present disclosure.

The NOTAM before being enhanced 502 reads, “SVC TWR CLSD MON-SUN 0100-1100, CLASS D SVC NOT AVBL CTC JACKSONVILLE APP AT 121.725”.

The NOTAM before being enhanced 502 may be used to generate a counterpart—an enhanced NOTAM 504. The enhanced NOTAM 504 reads, “The air traffic control tower at Cecil airport (VQQ) has changed hours of operation and is now closed between 0100UTC and 1100UTC daily. When closed, Class D services are not available and Jacksonville Approach Control controls the traffic.” Note that depending on the allowed font types of the present patent authority, the above enhanced NOTAM 504 may not necessarily show bolded text-in that case, please refer to FIG. 5 for examples of emphasized (e.g., bolded) text.

In an optional step, a graphical indication of each NOTAM may be changed from being in an unread state to being in a read state based on a user input associated with the NOTAM. For example, by default, each displayed NOTAM may be configured (by software stored on memory 106) to be displayed in an unread state. In embodiments, a user may touch one or more areas of a touchscreen of a display 112. Such user input may indicate that one or more of the NOTAMs are “read” (e.g., viewed) by the user. For example, touching a graphical representation of the NOTAM, a checkbox or the like associated with the NOTAM, or a “clear all” or similar button/option, may be configured to cause one or more (e.g., all) of the displayed NOTAMs to be changed from an “unread” state to a “read” state. In this regard, a user may keep track of which NOTAMs they have already viewed and which NOTAMs they haven’t, such as newly added NOTAMs. The unread state and the read state may be indicated by any graphical method known in the art. For example, a checkbox near the NOTAM may be empty in an unread state and checked in the read state. In another example, a darker (e.g., black) font may be used for unread NOTAMs and a lighter (e.g., grayer) font may be used for read NOTAMs. In another example, a vertical line or box (e.g., thin vertical line) may be next to unread NOTAMs and such a line/box may be removed and replaced with background in a read state.

In an optional step, additional NOTAMs may be received. For example, additional NOTAMs may be acquired in the same or different way as the NOTAMs acquired in step 202. In examples, at least a portion of the additional NOTAMs may be enhanced to generate additional enhanced NOTAMs. For instance, the enhancing may be the same, similar, or different to the enhancing of step 208. In examples, at least a portion of the additional enhanced NOTAMs are directed to be displayed via the display 112. For example, the additional enhanced NOTAMs may be displayed in an unread state. For instance, the additional enhanced NOTAMs may be prioritized (vertically ordered) based on their relevancy value compared to the relevancy value of enhanced NOTAMs displayed in step 210.

FIG. 4A illustrates a conceptual map of geographic locations 404 of unfiltered NOTAMs and geographic flight data 402 of a flight plan, in accordance with one or more embodiments of the present disclosure. As shown, many NOTAMs 404 may be received by a system 138, even ones that are far away and irrelevant to a flight plan.

FIG. 4B illustrates a conceptual map of geographic locations 404 of filtered NOTAMs and geographic flight data 402 of a flight plan, in accordance with one or more embodiments of the present disclosure. For example, the NOTAMs 404 of FIG. 4A may be assigned a relevancy value according to step 206 in accordance with one or more embodiments. For instance, such a relevancy value may be used to filter out irrelevant NOTAMs. As shown, far fewer NOTAMs are shown in FIG. 4B.

The present system and method may significantly improve understandability and speed of reading NOTAMs, thereby increasing safety of a flight, efficiency in keeping track of NOTAMs, and remaining attention capacity for other tasks.

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase “means for.” Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain module or group of modules. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for use with Notice to Airmen (NOTAM), the system comprising:

a display; and one or more controllers including one or more processors configured to execute a set of program instructions stored in a memory, the set of program instructions configured to cause the one or more processors to:

acquire a set of NOTAMs, each NOTAM comprising NOTAM text and a geographic location;

acquire a flight plan including geographic flight data;

assign a relevancy value to each NOTAM of the set of NOTAMs based on at least a distance between the geographic location of the NOTAM with at least a portion of the geographic flight data;

enhance at least a portion of the set of NOTAMs to generate an enhanced set of NOTAMs, wherein, for each NOTAM of the at least the portion of the set of NOTAMs, the enhancing comprises at least one of:

converting one or more abbreviated terms of the NOTAM text into one or more respective expanded terms;

applying a set of capitalization rules to the NOTAM text; or emphasizing a portion of each word of the NOTAM text based on one or more emphasizing rules, wherein words are terms with only letters, wherein the one or more emphasizing rules comprises bolding the portion of each word of the NOTAM text, wherein the bolding the portion of each word comprises bolding only a first two letters of words comprising at least two letters, wherein the bolding is only applied to the words and not to terms including one or more numbers; and direct at least a portion of the enhanced set of NOTAMs to be at least one of displayed via the display or physically printed by a printer.

2. The system of claim 1, wherein the converting is performed using a database comprising abbreviated terms paired with expanded terms.

3. The system of claim 1, wherein the set of capitalization rules comprises at least one of:

capitalizing a first letter of a sentence of the NOTAM text; or converting at least some capitalized letters of entirely capitalized terms of the NOTAM text to lower case letters.

4. The system of claim 1 further comprising changing a graphical indication of each NOTAM from being in an unread state to being in a read state based on a user input associated with the NOTAM.

5. The system of claim 1 further comprising receiving additional NOTAMs, enhancing at least a portion of the additional NOTAMs to generate additional enhanced NOTAMs, and directing at least a portion of the additional enhanced NOTAMs to be displayed via the display.

6. A method comprising:

acquiring a set of NOTAMs, each NOTAM comprising NOTAM text and a geographic location;

acquiring a flight plan including geographic flight data;

assigning a relevancy value to each NOTAM of the set of NOTAMs based on at least a distance between the geographic location of the NOTAM with at least a portion of the geographic flight data;

enhancing at least a portion of the set of NOTAMs to generate an enhanced set of NOTAMs, wherein, for each NOTAM of the at least the portion of the set of NOTAMs, the enhancing comprises at least one of:

converting one or more abbreviated terms of the NOTAM text into one or more respective expanded terms;

applying a set of capitalization rules to the NOTAM text; or emphasizing a portion of each word of the NOTAM text based on one or more emphasizing rules, wherein words are terms with only letters, wherein the one or more emphasizing rules comprises bolding the portion of each word of the NOTAM text, wherein the bolding the portion of each word comprises bolding only a first two letters of words comprising at least two letters, wherein the bolding is only applied to the words and not to terms including one or more numbers; and directing at least a portion of the enhanced set of NOTAMs to be at least one of displayed via a display or physically printed by a printer.

7. The method of claim 6, wherein the converting is performed using a database comprising abbreviated terms paired with expanded terms.

8. The method of claim 6, wherein the set of capitalization rules comprises at least one of:

capitalizing a first letter of a sentence of the NOTAM text; or converting at least some capitalized letters of entirely capitalized terms of the NOTAM text to lower case letters.

9. The method of claim 6 further comprising changing a graphical indication of each NOTAM from being in an unread state to being in a read state based on a user input associated with the NOTAM.

10. The method of claim 6 further comprising receiving additional NOTAMs, enhancing at least a portion of the additional NOTAMs to generate additional enhanced NOTAMs, and directing at least a portion of the additional enhanced NOTAMs to be displayed via the display.

11. A method comprising:

enhancing at least a portion of a set of NOTAMs to generate an enhanced set of NOTAMs, wherein, for each NOTAM of the at least the portion of the set of NOTAMs, the enhancing comprises at least one of:

converting one or more abbreviated terms of a NOTAM text of the NOTAM into one or more respective expanded terms;

applying a set of capitalization rules to the NOTAM text; or emphasizing a portion of each word of the NOTAM text based on one or more emphasizing rules, wherein words are terms with only letters, wherein the one or more emphasizing rules comprises bolding the portion of each word of the NOTAM text, wherein the bolding the portion of each word comprises bolding only a first two letters of words comprising at least two letters, wherein the bolding is only applied to the words and not to terms including one or more numbers; and directing at least a portion of the enhanced set of NOTAMs to be at least one of displayed via a display or physically printed by a printer.

12. The method of claim 11 further comprising receiving additional NOTAMs, enhancing at least a portion of the additional NOTAMs to generate additional enhanced NOTAMs, and directing at least a portion of the additional enhanced NOTAMs to be displayed via the display.

* * * * *